United States Patent

Nakayama et al.

Patent Number: 5,982,713
Date of Patent: *Nov. 9, 1999

[54] MAGNETO-OPTICAL RECORDING MEDIUM

[75] Inventors: Junichiro Nakayama, Shiki-gun; Junji Hirokane, Nara; Michinobu Mieda, Shiki-gun; Akira Takahashi, Nara, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/719,753

[22] Filed: Sep. 25, 1996

[30] Foreign Application Priority Data

Oct. 23, 1995 [JP] Japan .................... 7-274492

[51] Int. Cl.$^6$ ............................ G11B 11/00
[52] U.S. Cl. .......................... 369/13; 428/694 ML
[58] Field of Search .................. 369/13, 14, 110, 369/116; 428/694 ML, 694 SC, 694 LE, 694 MT, 694 RE, 694 MM, 694 EC, 694 T, 694 TM; 360/59, 114

[56] References Cited

U.S. PATENT DOCUMENTS

| | | | |
|---|---|---|---|
| Re. 35,630 | 10/1997 | Saito | 369/13 |
| 4,645,722 | 2/1987 | Katayama et al. | 428/694 ML |
| 5,379,275 | 1/1995 | Kaneko | 369/13 |
| 5,498,485 | 3/1996 | Nakayama et al. | 428/694 ML |
| 5,637,411 | 6/1997 | Shimazaki et al. | 428/694 ML |
| 5,645,911 | 7/1997 | Matsumoto | 428/64.3 |
| 5,656,384 | 8/1997 | Nishimura et al. | 428/694 ML |

FOREIGN PATENT DOCUMENTS

| | | |
|---|---|---|
| 0586175 | 3/1994 | European Pat. Off. . |
| 0596716 | 5/1994 | European Pat. Off. . |
| 7-161082 | 5/1995 | Japan . |

OTHER PUBLICATIONS

Published Unexamined Japanese Patent Application No. 5-22303, Published Mar. 29, 1993.

Published Unexamined Japanese Patent Application No. 7-161802, Published Jun. 23, 1995.

J. Nakayama, et al. "Direct Overwriting Using Magnetooptical Trilayer and One Magnet", Published Oct. 16, 1993, pp. 5439-5440.

Primary Examiner—Tan Dinh
Attorney, Agent, or Firm—David G. Conlin; William J. Daley, Jr.

[57] ABSTRACT

A magneto-optical recording medium includes first, second, and third magnetic layers laminated in this order. The first magnetic layer, made of a rare earth-transition metal alloy, has a great coercive force at room temperature and is transition metal rich in a temperature range between room temperature and a Curie temperature of the first magnetic layer. The second magnetic layer, made of a rare earth-transition metal alloy, has a Curie temperature higher than that of the first magnetic layer and is rare-earth metal rich at room temperature. The third magnetic layer, made of a rare earth-transition metal alloy, has a Curie temperature higher than that of the first magnetic layer, and a compensation temperature falling in a temperature range between room temperature and the Curie temperature of the third magnetic layer. A magnetization of the third magnetic layer is transferred to the first magnetic layer at a temperature higher than room temperature. A perpendicular magnetic anisotropy Ku3 satisfies $0.3 \times 10^6$ erg/cc$<$Ku3$<1.0 \times 10^6$ erg/cc. This arrangement ensures recording by the light modulation overwriting method while achieving the compatibility with other recording/reproducing apparatuses in accordance with the ISO standard, and enables miniaturization of recording/reproducing apparatuses for the magneto-optical recording media.

10 Claims, 6 Drawing Sheets

MAGNETO-OPTICAL RECORDING MEDIUM

FIELD OF THE INVENTION

The present invention relates to a magneto-optical recording medium, such as a magneto-optical disk, a magneto-optical tape, and a magneto-optical card, which carries out at least one of magneto-optical recording, reproduction, and erasion of information.

BACKGROUND OF THE INVENTION

The magneto-optical recording method is a method for recording and reproducing, in a manner described below, to and from a recording medium composed of a substrate and a perpendicularly-magnetized film made of a magnetic substance which is formed on the substrate.

The recording operation begins with initialization of the recording medium by a strong external magnetic field or the like, whereby the magnetization of the recording medium is directed in one specific direction (either upward or downward). Thereafter, a laser beam is projected on an area where information is to be recorded, so that the area of the recording medium is heated to not lower than around a Curie temperature of the magnetic film or not lower than around a compensation temperature of the magnetic film. As a result, the heated area of the magnetic film has no coercive force (Hc), or substantially no coercive force (Hc). In this state, an external magnetic field (bias magnetic field) with a magnetization direction opposite to that of the magnetization for the initialization is applied so that the magnetization direction of the area is reversed. When the projection of the laser beam is suspended, the temperature of the recording medium falls to the room temperature, whereby the magnetization thus reversed is fixed. Thus, information is thermal-magnetically recorded.

For reproducing information, a linearly polarized laser beam is projected on the recording medium, so that optical reading-out of information is carried out by making use of a phenomenon that the plane of polarization of reflected light or transmitted light of the laser beam rotates in accordance with the magnetization direction (the magnetic Kerr effect, and the magnetic Faraday effect).

The magneto-optical recording method has been viewed with interest as a method for recording with respect to rewritable high density and large capacity memory device. As such a method for reusing (rewriting) the media, a so-called light modulation overwriting method has been proposed. According to this method, overwriting by the light intensity modulation is carried out with respect to a recording medium which has a recording layer composed of two exchange-coupled films, by using an initializing magnetic field (Hi) and a recording magnetic field (Hw).

An magneto-optical recording medium to which the light modulation overwriting method is applicable is proposed in the Japanese Examined Patent Publication 5-22303/1993. As shown in FIG. 8, a recording layer of the recording medium disclosed in the publication is triplicated with a second magnetic layer 14 being provided between a first magnetic layer 13 and a third magnetic layer 15, so that the initializing magnetic field (Hi) is allowed to be smaller and that the recording medium has superiority in the stability of recording bits. The following description will depict steps for overwriting the described recording medium.

FIG. 9 is a view illustrating states of respective magnetizations of the first through third magnetic layers 13 through 15, wherein the horizontal axis indicates temperature. Since the layers are rare earth-transition metal alloys, each has a total magnetization and respective sub-lattice magnetizations of rare-earth and transition metal. Voided arrows represent the directions of the transition metal sub-lattice magnetizations of the respective layers.

Initialization is carried out by applying the initializing magnetic field Hi so that, as shown in FIG. 9, only the magnetization direction of the third magnetic layer 15 is directed in one specific direction (upward in the figure). Since a strength of the initializing magnetic field Hi is smaller than that of a coercive force of the first magnetic layer 15 at room temperature while greater than that of a coercive force of the third magnetic layer 15 at room temperature, the magnetization direction of the first magnetic layer 13 is not reversed. The second magnetic layer 14 has an in-plane magnetic anisotropy at room temperature. Therefore, it has an effect of preventing exchange-coupling between the first magnetic layer 13 and the third magnetic layer 15.

Recording is carried out by applying the recording magnetic field Hw while projecting the laser beam whose light intensity is modulated either to a high power or a low power.

The high power of the laser beam is set so that the projection of the high power laser beam causes the recording medium to be heated to the vicinity of a Curie temperature of the third magnetic layer 15. The low power of the laser beam is set so that the projection of the low power laser beam causes the recording medium to be heated to the vicinity of a Curie temperature of the first magnetic layer 13.

Therefore, on the projection of the high power laser beam, the magnetization direction of the third magnetic layer 15 is reversed downward as shown in FIG. 9, by the recording magnetic field Hw. The magnetization direction of the third magnetic layer 15 is copied, by the exchange coupling force exerted to an interface in the cooling process, to the second magnetic layer 14 having a perpendicular magnetic anisotropy, and then to the first magnetic layer 13. As a result, the magnetization direction of the first magnetic layer 13 is directed upward.

On the other hand, the magnetization direction of the third magnetic layer 15 is not reversed on the projection of the low power laser beam, since in such a state a strength of the coercive force of the third magnetic layer 15 is greater than that of the recording magnetic field Hw. The magnetization direction of the first magnetic layer 13 is directed in the same direction as that of the magnetization of the third magnetic layer 15 by the exchange-coupling force exerted to the interface in the cooling process, as described above. Therefore, the magnetization of the first magnetic field 13 has a downward direction as shown in FIG. 9.

Note that FIG. 10 illustrates, about a conventional magneto-optical recording meidum, a relation between a perpendicular magnetic anisotropy Ku3 at room temperature of the third magnetic layer 15 of the conventional magneto-optical recording medium and the recording magnetic field Hw, and a relation between the perpendicular magnetic anisotropy Ku3 and the initializing magnetic field Hi. As shown in the figure, the recording magnetic field Hw is set considerably smaller than the initializing magnetic field Hi. A reproduction-use laser power is set considerably smaller than the recording-use low laser power.

The above-described conventional technology thus has provided a magneto-optical recording medium (1) to which the light modulation overwriting method is applicable, (2) which allows an initializing magnetic field to be relatively small, and (3) which is superior in the stability of the recording bits. The technology, however, has still presented a problem that the initializing magnetic field Hi greater than the recording magnetic field Hw is required, which leads to a problem that apparatuses cannot be miniaturized.

Furthermore, in the case of a disk-type magneto-optical recording medium, an apparatus which can generate such a great initializing magnetic field to be used with the disk-type magneto-optical recording medium does not meet the standards of the International Organization for Standization (ISO). Therefore, arises a problem that the foregoing conventional magneto-optical recording medium cannot be compatible with other recording-reproducing apparatuses in accordance with the ISO Standard.

SUMMARY OF THE INVENTION

An object of the present invention is to provide a magneto-optical recording medium which has compatibility with other recording/reproducing apparatuses in accordance with the ISO Standard, which allows the light modulation overwriting method to be applied to the same, and which ensures miniaturization of the recording/reproducing apparatus for use with the same.

To achieve the above object, a first magneto-optical recording medium of the present invention includes at least a first magnetic layer and a third magnetic layer, wherein the third magnetic layer has a perpendicular magnetic anisotropy Ku3 at room temperature, the Ku3 satisfying:

$$0.3 \times 10^6 \text{ erg/cc} < Ku3 < 1.0 \times 10^6 \text{ erg/cc}$$

With the above arrangement, a strength of an initializing magnetic field for directing a magnetization direction of the third magnetic layer in a specific direction can be reduced to lower than that of a recording magnetic field. This ensures the compatibility with other recording/reproducing apparatuses in accordance with the ISO Standard, the application of the light modulation overwriting method, and the miniaturization of the recording/reproducing apparatuses.

A second magneto-optical recording medium has the following characteristics, in addition to the same characteristics as those of the first magneto-optical recording medium: the first magnetic layer, made of a rare earth-transition metal alloy, is transition metal rich in a temperature range from room temperature to a Curie temperature of the first magnetic layer; and the third magnetic layer, made of a rare earth-transition metal alloy, is rare-earth metal rich at room temperature, has a Curie temperature higher than that of the first magnetic layer, and has a compensation temperature falling in a temperature range between room temperature and the Curie temperature of the third magnetic layer.

With the described arrangement, it is possible to direct the magnetization direction of the third magnetic layer in one specific direction, solely by applying an external magnetic field when the magneto-optical recording medium is heated, over room temperature, to lower than a temperature Tl in the vicinity of the Curie temperature of the first magnetic layer 3, the external magnetic field having a strength required for reversing the magnetization direction of the third magnetic layer when the magneto-optical recording medium is heated to the compensation temperature $T_{comp3}$ of the third magnetic layer. In other words, the strength of the initializing magnetic field for directing the magnetization direction of the third magnetic layer is set smaller than that of the recording magnetic field, and the initializing magnetic field has the same direction as that of the recording magnetic field.

Therefore, the recording magnetic field can be utilized as the initializing magnetic field. This virtually ensures initialization without an initializing magnetic field, whereas this ensures the compatibility with other recording/reproducing apparatuses in accordance with the ISO Standard and the application of the light modulation overwriting method.

A third magneto-optical recording medium has the following characteristics, in addition to those of the first and second magneto-optical recording media: the third magneto-optical recording medium has a zeroth magnetic layer, which is provided on a surface of the first magnetic layer, which is opposite to a surface on which side the third magnetic layer is provided; and the zeroth magnetic layer has an in-plane magnetization at room temperature, and has a perpendicular magnetization in a predetermined temperature range between room temperature and the Curie temperature of the first magnetic layer.

With the described arrangement, when a light beam is projected on the zeroth magnetic layer during a reproducing operation, an irradiated area has a substantial Gaussian temperature distribution. Therefore, temperature rises in an area in the vicinity of the center, which is smaller than the diameter of the light beam. With this temperature rise, a transition from an in-plane magnetization to a perpendicular magnetization occurs in the magnetization of the area having the temperature rise.

Here, the magnetization direction of the zeroth magnetic layer is directed in the magnetization direction of the first magnetic layer, by an exchange-coupling force between the zeroth and first magnetic layers. When the transition from the in-plane magnetization to the perpendicular magnetization occurs in the magnetization of the area having the temperature rise, only the area having the temperature rise has the polar Kerr effect, and allows information to be reproduced based on a reflected light from the same area.

When the light beam moves so as to reproduce a neighboring recording bit, the temperature in the area having been irradiated by the light beam falls. Therefore, a transition from the perpendicular magnetization to the in-plane magnetization occurs in the area, and the polar Kerr effect becomes not exhibited. This means that the magnetization recorded in the first magnetic layer is masked by the in-plane magnetization of the zeroth magnetic layer, thereby being not read out. Therefore, it is possible to avoid contamination by signals from neighboring bits which causes noise and deteriorates resolution in reproduction.

As a result, only an area having a temperature not lower than a predetermined temperature becomes a target for reproduction, thereby enabling reproduction from a smaller bit compared with the conventional cases, and drastically enhancing recording density.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

The following description will discuss an embodiment of the present invention, with reference to FIGS. 1 through 5.

Figure 1:
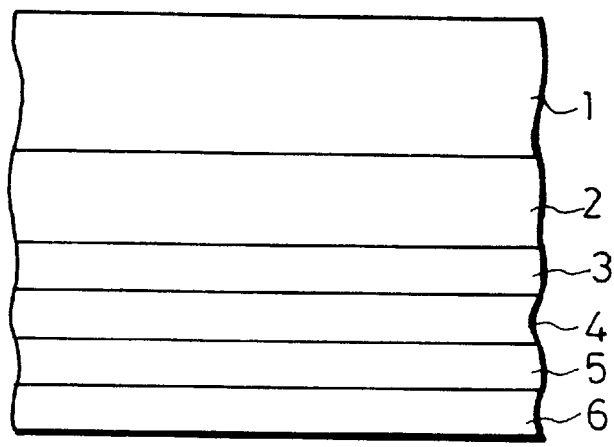
FIG. 1 is a view illustrating a schematic arrangement of a magneto-optical disk as a magneto-optical recording medium of the present invention.

A magneto-optical disk (magneto-optical recording medium) of the present embodiment includes a translucent substrate 1, a translucent dielectric layer 2, a first magnetic layer 3, a second magnetic layer 4, a third magnetic layer 5, a protective layer 6, and an overcoat layer (not shown), which are laminated in this order, as shown in FIG. 1. The first through third magnetic layers 3 through 5 are made of respective rare earth-transition metal alloys.

Figure 2:
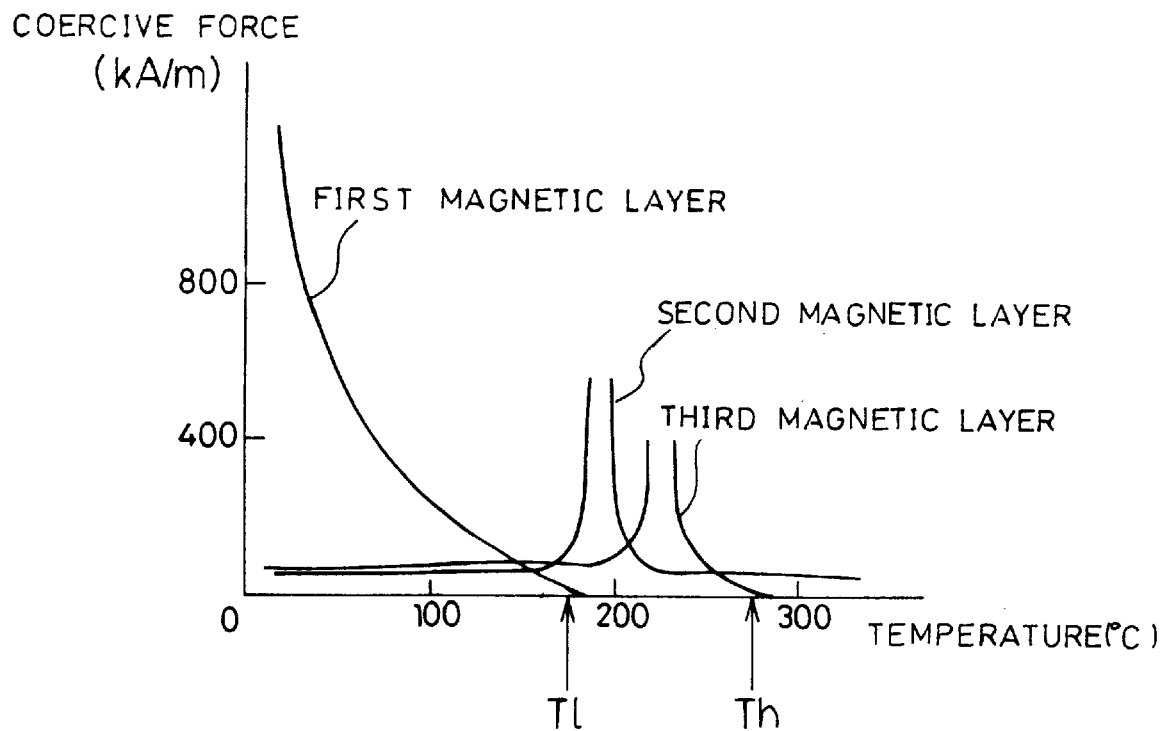
FIG. 2 is a graph illustrating temperature dependence of coercive forces of first through third magnetic layers of the magneto-optical recording disk illustrated in FIG. 1.

The first magnetic layer 3 is arranged so that (1) it has a lower Curie temperature $Tc_1$ and a greater coercive force $HC_2$ at room temperature, compared with the second and third magnetic layers 4 and 5 as shown in FIG. 2, (2) it has a perpendicular magnetization at a temperature falling in a temperature range from room temperature to its Curie temperature $Tc_1$, and (3) it is transition metal rich at room temperature.

The second magnetic layer 4 is arranged so that (1) it has a Curie temperature $Tc_2$ higher than the Curie temperature $Tc_1$ of the first magnetic layer 3, and (2) it is rare-earth metal rich at room temperature.

The third magnetic layer 5 is arranged so that (1) it has a Curie temperature $Tc_3$ higher than the Curie temperature $Tc_1$ of the first magnetic layer 3, (2) it is rare-earth metal rich at toom temperature, and (3) it has a compensation temperature falling in a range between room temperature and its Curie temperature.

Figure 3:
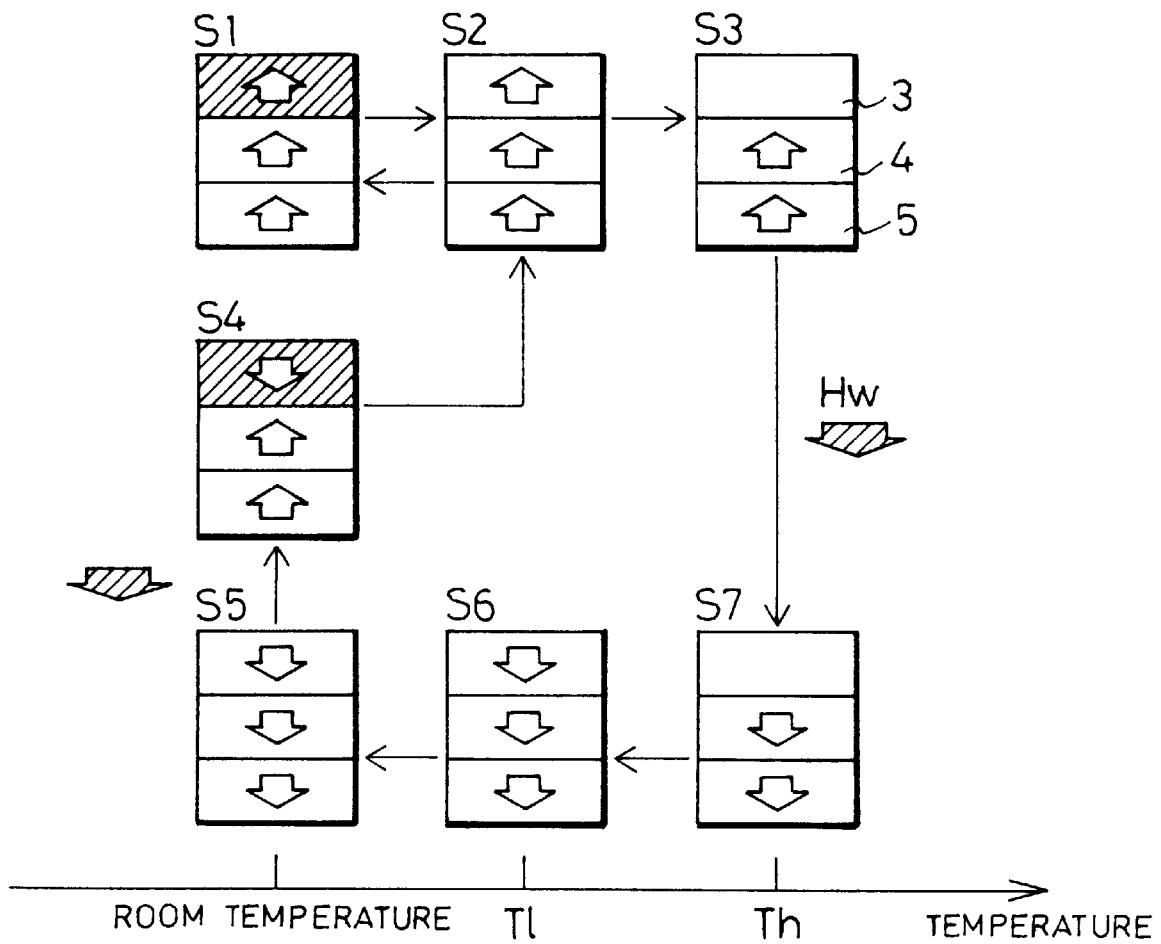
FIG. 3 is a view illustrating respective magnetic conditions of the first through third magnetic layers in a recording process with respect to the magneto-optical disk illustrated in FIG. 1.

The following description will depict a recording process, with reference to FIG. 3. FIG. 3 illustrates the respective states of the magnetizations of the first through third magnetic layers 3 through 5. The horizontal axis in the figure indicates temperature. Since these layers are made of respective rare earth-transition metal alloys, each layer has a total magnetization and respective sub-lattice magnetizations of the rare-earth metal and the transition metal. The voided arrows in the figure indicate directions the sub-lattice magnetizations of the transition metals of the respective layers.

In order to carry out the light modulation overwriting with respect to the foregoing recording medium, an initializing operation is required so as to direct the magnetization direction of the third magnetic layer 5 in one specific direction. The present embodiment does not require a great initializing magnetic field as the conventional one for a reason described later, and uses a smaller external magnetic field Hw so as to carry out the initialization.

To give an outline of the recording process, the initializing operation is carried out first of all, wherein, as described later, a laser beam is projected on the recording medium while the external magnetic field Hw is applied thereto so that the magnetization direction of the third magnetic layer 5 is directed in one specific direction. Then, the light intensity of the laser beam is modulated in accordance with information while the external magnetic field Hw is applied to an area where the laser beam is projected. The modulation of the light intensity of the laser beam has the following two processes. In one of the processes, the area irradiated by the laser beam is heated to around a temperature (Th) in the vicinity of the Curie temperature Tc3 of the third magnetic layer 5 (hereinafter referred to "high temperature process"). In the other process, the area irradiated by the laser beam is heated to around a temperature (Tl) in the vicinity of the Curie temperature of Tc1 of the first magnetic layer 3, which is lower than the temperature Th (hereinafter referred to "low temperature process"). By selectively repeating the two processes, overwriting of information is carried out so as to rewrite information.

The following description will discuss the foregoing recording process in detail.

At room temperature, the layers are in stable states S1 and S2, with the respective magnetization directions thereof directed in accordance with the sub-lattice magnetization direction of the first magnetic layer 3. The external magnetic field Hw is applied to the recording medium in such a state while the laser beam having an intensity Pr (see FIG. 4) is also projected thereto, thereby surely causing the magnetization direction of the third magnetic layer 5 to be directed to the same direction as that of the external magnetic field Hw (downward in this case) Thus, the initialization is completed.

The following description will explain the high temperature process and the low temperature process. In the high temperature process, the laser beam with a high power Ph (see FIG. 4) is projected. When the respective magnetic layers are heated to the temperature Th, the first magnetic layer 3 has no coercive force (in the state S3), while respective strengths of the coercive forces of the second magnetic layer 4 and the third magnetic layer 5 become smaller than that of the external magnetic field Hw. Therefore, the respective magnetization directions of the second and third magnetic layers 4 and 5 are directed in one direction (downward in this case) in accordance with the external magnetic field Hw having a direction which is downward in the figure. Thus, the external magnetic field Hw here plays a role as a recording magnetic field. Since the third magnetic layer 5 is transition metal rich at the temperature Th, the sub-lattice magnetization of the transition metal has the same direction as that of the external magnetic field Hw, namely, downward in FIG. 3. Thus, the states S1 and S4 shift to the state S2, then to the state S3, and finally to the state S7.

When the area having been irradiated by the laser beam becomes out of the scope of the projection of the laser beam due to the rotation of the magneto-optical disk, thereby being cooled down, the first magnetic layer 3 comes to have a magnetization. In this state, the sub-lattice magnetization of the first magnetic layer 3 is directed in the sub-lattice magnetization directions of the second and third magnetic layer 4 and 5 by the exchange-coupling force exerted on the interfaces therebetween. Therefore, the state S7 shifts to the state 6.

Figure 4:
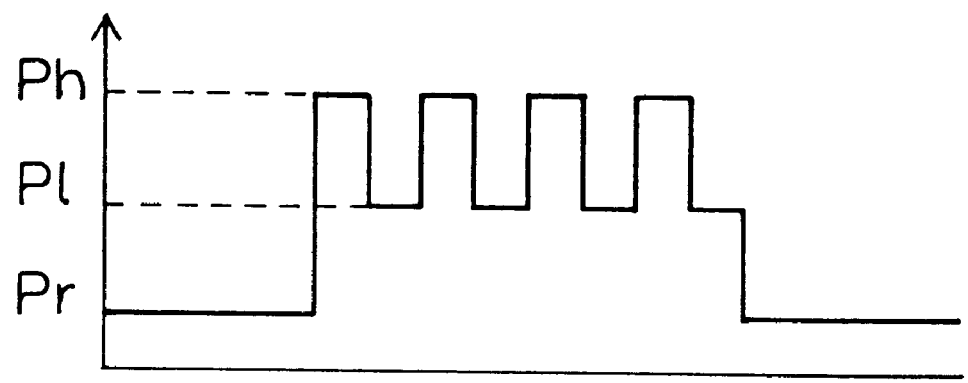
FIG. 4 is a graph illustrating intensities of a laser beam projected on the magneto-optical disk illustrated in FIG. 1.

When the portion having been irradiated by the laser beam is further cooled down to room temperature, the third magnetic layer 5 becomes rare-earth metal rich. Therefore, the sub-lattice magnetization of the transition metal of the third magnetic layer 5 comes to have a direction opposite to that of the total magnetization, that is, a direction (upward in this case) opposite to that of the external magnetic field Hw. Thus, the state S6 shifts to the state S5, then to the state S4. Thus, on the completion of the recording process, the magnetization direction of the third magnetic layer 5 is directed in one specific direction (downward in this case) by the external magnetic field Hw, thereby being initialized. Note that since in this state the laser beam with the intensity Pr of FIG. 4 is projected, the magnetization direction of the third magnetic layer 5 is effectually reversed, thereby ensuring that the initialization is carried out. Furthermore, since the first magnetic layer 3 has a sufficiently great coercive force as is clear from FIG. 2, neither the magnetization direction of the second magnetic layer 4 nor that of the third magnetic layer 5 is transferred to the first magnetic layer 3.

In the low temperature process, the laser beam with the low power Pl shown in FIG. 4 is projected to the recording medium in the state 1 or the state 4, so as to heat it up to the temperature Tl. In this case, since a strength of the coercive force of the third magnetic layer 5 is greater than that of the external magnetic field Hw, the magnetization direction of the third magnetic layer 5 is not reversed by the external magnetic field Hw. The sub-lattice magnetization direction of the first magnetic layer 3 is directed in the same direction as that of the sub-lattice magnetizations of the second and third magnetic layers 4 and 5 by the exchange-coupling force exerted on the interfaces, as is the case described above. Thus, the states S1 and S4 shift to the state S2.

After the area having been irradiated by the laser beam is cooled down to room temperature due to the rotation of the magneto-optical disk causing shift of the laser beam projection, the state of the magnetization is maintained. Therefore, the state S2 shifts to the state S1.

As has been described so far, the first magnetic layer 3 comes to have a sub-lattice magnetization directed downward (state S4) in the high temperature process, while the first magnetic layer 3 comes to have a sub-lattice magnetization directed upward (state S1) in the low temperature process. Thus, the light modulation overwriting is carried out.

In the present embodiment, unlike the conventional case, only a magnetic field with the same strength as that of the recording-use magnetic field (the external magnetic field Hw in the present embodiment) is required for initializing the magnetization direction of the third magnetic layer 5. In addition, the respective recording-use and initialization-use magnetic fields may have the same direction (downward in FIG. 3). Therefore, it is possible to give the external magnetic field Hw the both roles of (1) reversing the magnetization direction of the third magnetic layer 5 in the high temperature process and (2) directing the magnetization direction of the third magnetic layer 5 in a specific direction of the initialization (downward in FIG. 3) at the beginning and end of the recording process in the high temperature process. With this arrangement, a conventionally indispensable device for generating a strong initializing magnetic field is unnecessary.

For reproducing information, the laser beam with the reproduction power Pr shown in FIG. 4 is projected on the recording medium, and information is reproduced by detecting a rotation of a plane of polarization of reflected light of the laser beam from the first magnetic layer 3. In this case, the respective magnetic layers are heated considerably lower than the temperature Tl. Therefore, information recorded in the first magnetic layer 3 is by no means erased by the laser beam with the reproduction power Pr.

Figure 5:
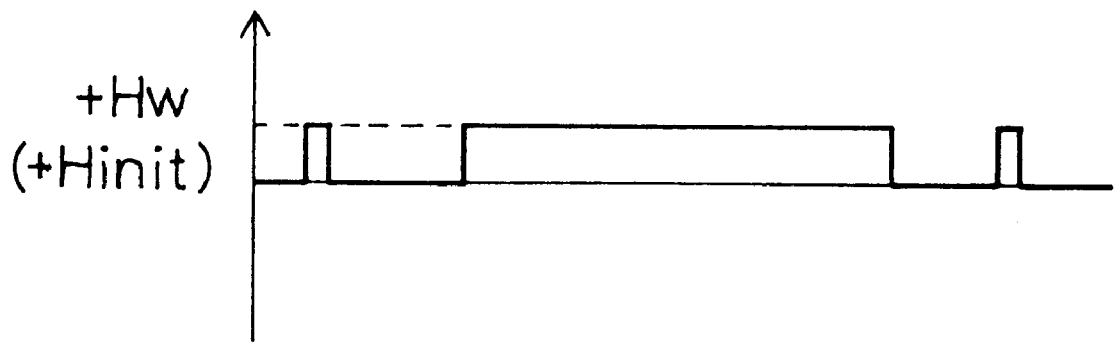
FIG. 5 is a graph illustrating strengths of a recording magnetic field applied to the magneto-optical disk illustrated in FIG. 1.

FIG. 5 is a graph illustrating strength of the external magnetic field Hw applied to the recording medium. As is clear from the figure, the external magnetic field Hw plays a role as the initializing magnetic field during the projection of the laser beam with the reproduction power Pr, while it plays a role as the recording magnetic field during the projection of the laser beam with the power Ph, and in both the cases the external magnetic field Hw has the same strength and direction.

The following description will show magneto-optical disk samples as examples of the magneto-optical recording medium.

A magneto-optical disk of sample #1 has a disk-shaped translucent substrate 1 made of glass with an outer diameter of 86 mm, an inner diameter of 15 mm, and a thickness of 1.2 mm. A concavo-convex guide track for guiding the laser beam is formed directly on one surface of the substrate 1 by an reactive ion etching method. The track has a track pitch of 1.6 $\mu$m, a groove width of 0.8 $\mu$m, and a land width of 0.8 $\mu$m.

On the surface of the substrate 1 where the guide track is formed, a dielectric layer 2 with a thickness of 80 nm, a first magnetic layer 3 with a thickness of 45 nm, a second magnetic layer 4 with a thickness of 40 nm, a third magnetic layer 5 with a thickness of 90 nm, and a protective layer 6 with a thickness of 20 nm are laminated in this order. The dielectric layer 2, made of AlN, was formed by a reactive sputtering method. The first magnetic layer 3, made of DyFeCo, was formed by a simultaneous sputtering method using Dy, Fe, and Co targets. The second magnetic layer 4, made of GdFeCo, was formed by the simultaneous sputtering method using Gd, Fe, and Co targets. The third magnetic layer 5, made of GdDyFeCo, was formed by the simultaneous sputtering method using Gd, Dy, Fe, and Co targets. The protective layer 6 is made of AlN.

The first magnetic layer 3 which is made of $Dy_{0.19}(Fe_{0.85}Co_{0.15})_{0.81}$ is transition metal rich and has the following properties:

Curie temperature $TC_1=180°$ C.; and coercive force $Hc_1$ at room temperature=15 kOe.

The second magnetic layer 4 which is made of $Gd_{0.27}(Fe_{0.70}Co_{0.30})_{0.73}$ is rare-earth metal rich and has the following properties:

Curie temperature $TC_2 \geq 300°$ C.; and compensation temperature $T_{comp2}=170°$ C.

The third magnetic layer 5 which is made of $(Gd_{0.80}Dy_{0.20})_{0.29}(Fe_{0.80}Co_{0.20})_{0.71}$ is rare-earth metal rich and has the following properties:

Curie temperature $Tc_3=280°$ C.;

compensation temperature $T_{comp3}=200°$ C.; and perpendicular magnetic anisotropy Ku3 at room temperature=$0.9 \times 10^6$ erg/cc.

A recording operation was carried out with respect to the magneto-optical disk of sample #1, under the following conditions:

strength of external magnetic field Hw=90 kA/m;

high power Ph of laser beam=10 mW;

low power Pl of laser beam=6 mW;

reproduction power Pr of laser beam=1 mW; and recording bit length=0.78 Hm.

As a result, recording by the light modulation overwriting method was feasible, and the carrier-to-noise ratio (C/N) was 45 dB, which is satisfactory.

A magneto-optical disk of sample #2 has the same configuration as that of sample #1 except the third magnetic layer 5. A third magnetic layer 5 of the magneto-optical disk of sample #2, made of $(Gd_{0.85}Dy_{0.15})_{0.29}(Fe_{0.82}Co_{0.18})_{0.71}$, is rare-earth metal rich, and has the following properties:

Curie temperature $Tc_3=280°$ C.;

compensation temperature $T_{comp3}=200°$ C.; and perpendicular magnetic anisotropy Ku3 at room temperature=$0.7\times10^6$ erg/cc.

A recording operation was carried out with respect to the magneto-optical disk of sample #2, under the following conditions:

strength of external magnetic field Hw=60 kA/m;

high power Ph of laser beam=10 mW;

low power Pl of laser beam=6 mW;

reproduction power Pr of laser beam=1 mW; and recording bit length=0.78 µm.

As a result, recording by the light modulation overwriting method was feasible, and the carrier-to-noise ratio (C/N) was 45 dB, which is satisfactory.

A magneto-optical disk of sample #3 has the same configuration as that of sample #1 except the third magnetic layer 5. A third magnetic layer 5 of the magneto-optical disk of sample #3, made of $(Gd_{0.90}Dy_{0.10})_{0.29}(Fe_{0.85}Co_{0.15})_{0.71}$, is rare-earth metal rich, and has the following properties:

Curie temperature $TC_3=280°$ C.;

compensation temperature $T_{comp3}=200°$ C.; and perpendicular magnetic anisotropy Ku3 at room temperature=$0.5\times10^6$ erg/cc.

A recording operation was carried out with respect to the magneto-optical disk of sample #3, under the following conditions:

strength of external magnetic field Hw=50 kA/m;

high power Ph of laser beam=10 mW;

low power Pl of laser beam=6 mW;

reproduction power Pr of laser beam=1 mW; and recording bit length=0.78 µm.

As a result, recording by the light modulation overwriting method was feasible, and the carrier-to-noise ratio (C/N) was 45 dB, which is satisfactory.

A magneto-optical disk of sample #4 has the same configuration as that of sample #3 except the first magnetic layer 3. A first magnetic layer 3 of the magneto-optical disk of sample #4, made of $(Gd_{0.20}Dy_{0.80})_{0.19}(Fe_{0.90}Co_{0.10})_{0.81}$, is transition metal rich, and has the following properties:

Curie temperature $Tc_1=180°$ C.; and coercive force $Hc_1$ at room temperature=15 kOe.

A recording operation was carried out with respect to the magneto-optical disk of sample #4, under the following conditions:

strength of external magnetic field Hw=50 kA/m;

high power Ph of laser beam=10 mW;

low power Pl of laser beam=5 mW;

reproduction power Pr of laser beam=1 mW; and recording bit length=0.78 µm.

As a result, recording by the light modulation overwriting method was feasible, and the carrier-to-noise ratio (C/N) was 45 dB, which is satisfactory.

A magneto-optical disk of sample #5 has the same configuration as that of sample #3 except the first magnetic layer 3. A first magnetic layer 3 of the magneto-optical disk of sample #5, made of $(Gd_{0.40}Dy_{0.60})_{0.19}(Fe_{0.95}Co_{0.05})_{0.81}$, is transition metal rich, and has the following properties:

Curie temperature $Tc_1=180°$ C.; and coercive force $Hc_1$ at room temperature=15 kOe.

A recording operation was carried out with respect to the magneto-optical disk of sample #5, under the following conditions:

strength of external magnetic field Hw=50 kA/m;

high power Ph of laser beam=10 mW;

low power Pl of laser beam=4 mW;

reproduction power Pr of laser beam=1 mW; and recording bit length=0.78 µm.

As a result, recording by the light modulation overwriting method was feasible, and the carrier-to-noise ratio (C/N) was 45 dB, which is satisfactory.

[Second Embodiment]

Figure 6:
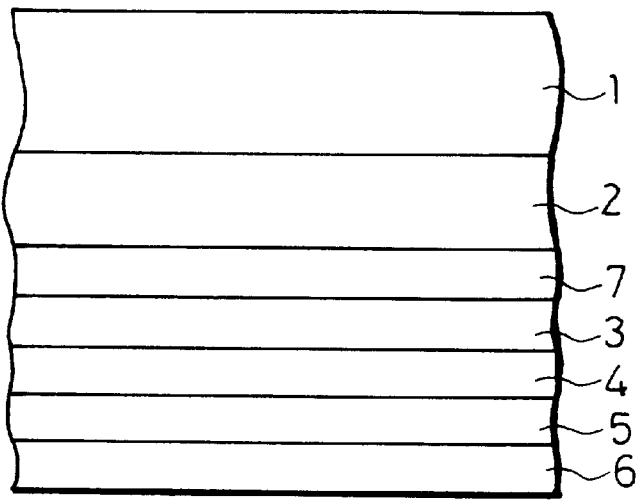
FIG. 6 is a view illustrating a schematic arrangement of another magneto-optical disk as a magneto-optical recording medium of the present invention.

The following description will discuss another embodiment of the present invention with reference to FIG. 6. The members having the same structure (function) as those in the above-mentioned embodiment will be designated by the same reference numerals and their description will be omitted.

A magneto-optical disk (magneto-optical recording medium) of the present embodiment has the same configuration as that of the foregoing embodiment except that a zeroth magnetic layer 7 is provided between the dielectric layer 2 and the first magnetic layer 3 in the magneto-optical disk of the present embodiment.

The zeroth magnetic layer 7 has a Curie temperature $Tc_0$ higher than that of the first magnetic layer 3, and has a substantially no coercive force at room temperature. It has an in-plane magnetic anisotropy at room temperature and a perpendicular magnetic anisotropy at a temperature higher than a certain temperature. It has a perpendicular magnetization in a certain temperature range within the temperature range between room temperature and the Curie temperature of the first magnetic layer 3.

A magneto-optical disk sample as an example of the magneto-optical recording medium is shown in the following description.

A magneto-optical disk of sample #6 has the same configuration as that of the magneto-optical disk of sample #1 of the first embodiment except that a zeroth magnetic layer 7 with a thickness of 40 nm is provided between the first magnetic layer 3 and the dielectric layer 2. The magneto-optical disk of sample #6 was produced by the same method as that for the sample #1.

The zeroth magnetic layer 7 of the magneto-optical disk of sample #6, made of $Gd_{0.29}(Fe_{0.80}Co_{0.20})_{0.71}$, is rare-earth metal rich, and has the following properties:

Curie temperature $Tc_0=300°$ C.;

no compensation temperature; and a transition occurs from the in-plane magnetic anisotropy to the perpendicular magnetic anisotropy at around 120° C.

Recording by the light modulation overwriting method was feasible with respect to the magneto-optical disk of sample #6, and the carrier-to-noise ratio (C/N) was 46 dB, which is satisfactory. The magneto-optical disk of sample #6 had signal quality superior to that of the magneto-optical disk of sample #1 which exhibited the carrier-to-noise ratio (C/N) of 45 dB. It can be considered that since the Curie temperature $Tc_0$ of the zeroth magnetic layer 7 was set to be higher than the Curie temperature $Tc_1$ of the first magnetic layer 3, a Kerr rotation angle was made greater, thereby enhancing the signal quality.

Furthermore, when an recording operation was carried out at a shorter recording bit, the carrier-to-noise ratio (C/N) of the magneto-optical disk of sample #1 drastically dropped, whereas that of the magneto-optical disk of sample #6 did not. The reason can be considered as follows. The zeroth magnetic layer 7 had an in-plane magnetic anisotropy at room temperature, and during the projection of the laser beam with the reproduction-use power only a center of an area irradiated by the laser beam came to have the perpendicular magnetic anisotropy. Therefore, transfer of a magnetization direction from the first magnetic layer 3 occurred only in the vicinity of the center of the irradiated area, thereby ensuring reproduction without affection from neighboring bits even though a recording bit was short.

Figure 7:
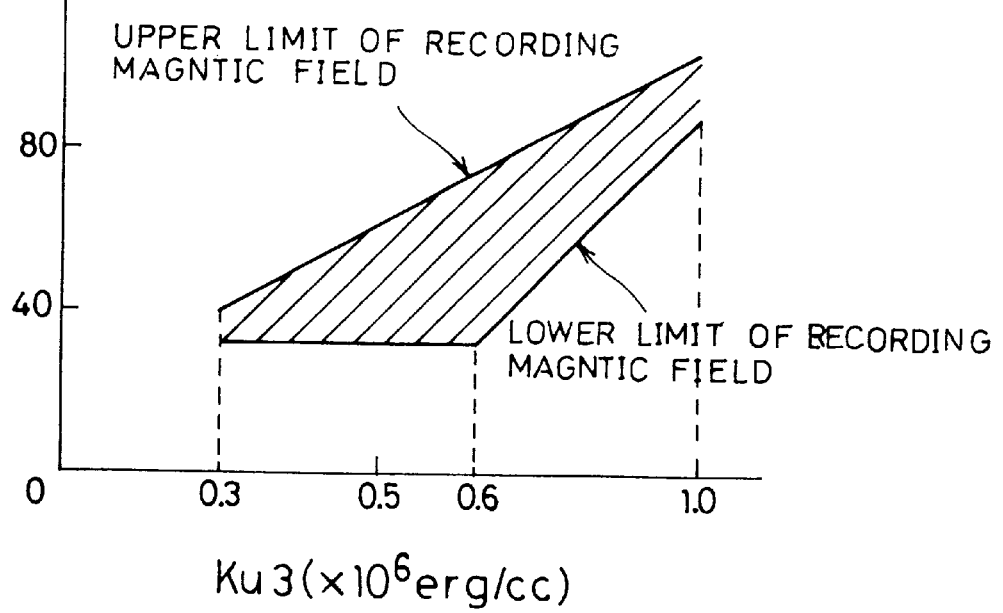
FIG. 7 is a graph illustrating a correlation between a perpendicular magnetic anisotropy of the third magnetic layer of the magneto-optical disk and the recording magnetic field.
Figure 8:
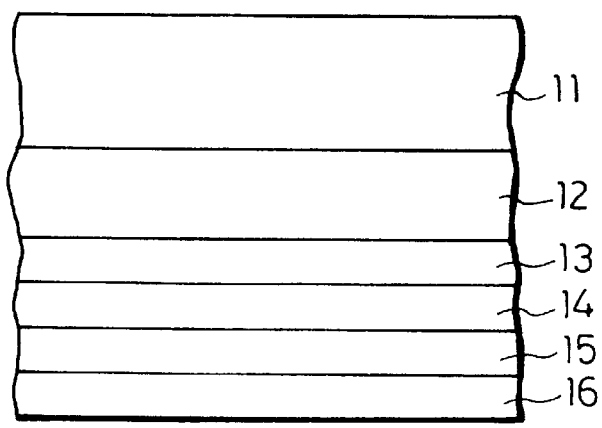
FIG. 8 is a view illustrating a schematic arrangement of a magneto-optical disk as a conventional magneto-optical recording medium.

FIG. 7 is a graph illustrating a relation between the perpendicular magnetic anisotropies Ku3 of the third magnetic layers 5 of the magneto-optical disks of samples #1 through #6 and the recording magnetic field (the external magnetic field Hw in the present embodiment). The hatching part in the figure indicates a range where recording by the light modulation overwriting method was feasible with solely the recording magnetic field (the external magnetic field Hw). More specifically, a strength which the initializing magnetic field (Hinit) is required to have is very small, namely, substantially the same level of strength as that of the recording magnetic field, provided that the perpendicular magnetic anisotropy Ku3 of the third magnetic layer 5 satisfies:

$$0.3 \times 10^6 \text{ erg/cc} < Ku3 < 1.0 \times 10^6 \text{ erg/cc}$$

In other words, under the above condition, the initializing magnetic field also has a level of strength falling in the vicinity of the range indicated by the hatching part, which is the optimal range for the recording magnetic field. Besides, as described before, the direction of the recording magnetic field is suitable for the initialization. For these reasons, it is possible to carry out recording and reproduction with respect to the magneto-optical disks of the present invention even by means of a conventional recording/reproducing apparatus not equipped with a device for generating a great initializing magnetic field, such as a recording/reproducing apparatus in accordance with the ISO standard. Therefore, the magneto-optical disks of the present invention (1) ensure that recording by the light modulation overwriting method is conducted thereto, (2) have compatibility with the magneto-optical recording/reproducing apparatuses in accordance with the ISO standard, and (3) does not require a device for generating the initializing magnetic field in addition to that for generating the recording magnetic field.

It is more preferable that the perpendicular magnetic anisotropy Ku3 satisfies:

$$0.3 \times 10^6 \text{ erg/cc} < Ku3 < 0.6 \times 10^6 \text{ erg/cc}$$

Accordingly, the strength of the recording magnetic field can be reduced to around 40 kA/m, thereby enabling miniaturization of the device for generating the recording magnetic field.

Figure 9:
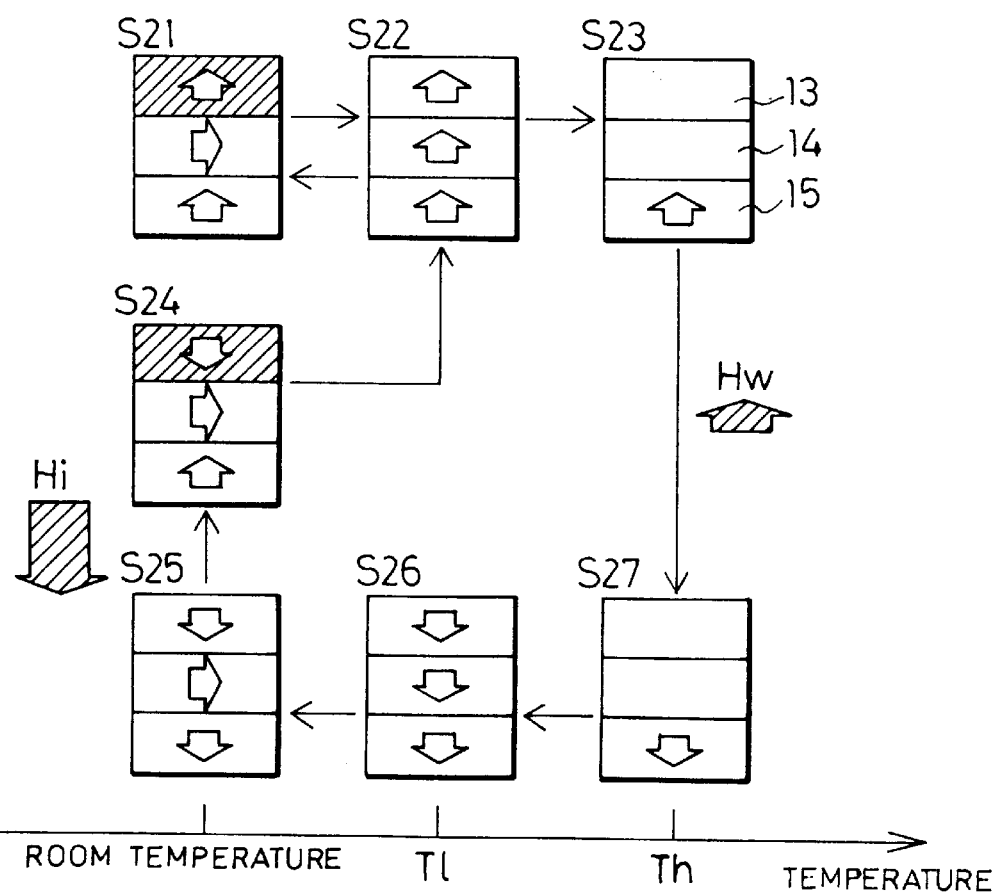
FIG. 9 is a view illustrating respective magnetic conditions of first through third magnetic layers of the conventional magneto-optical recording medium in a recording process.
Figure 10:
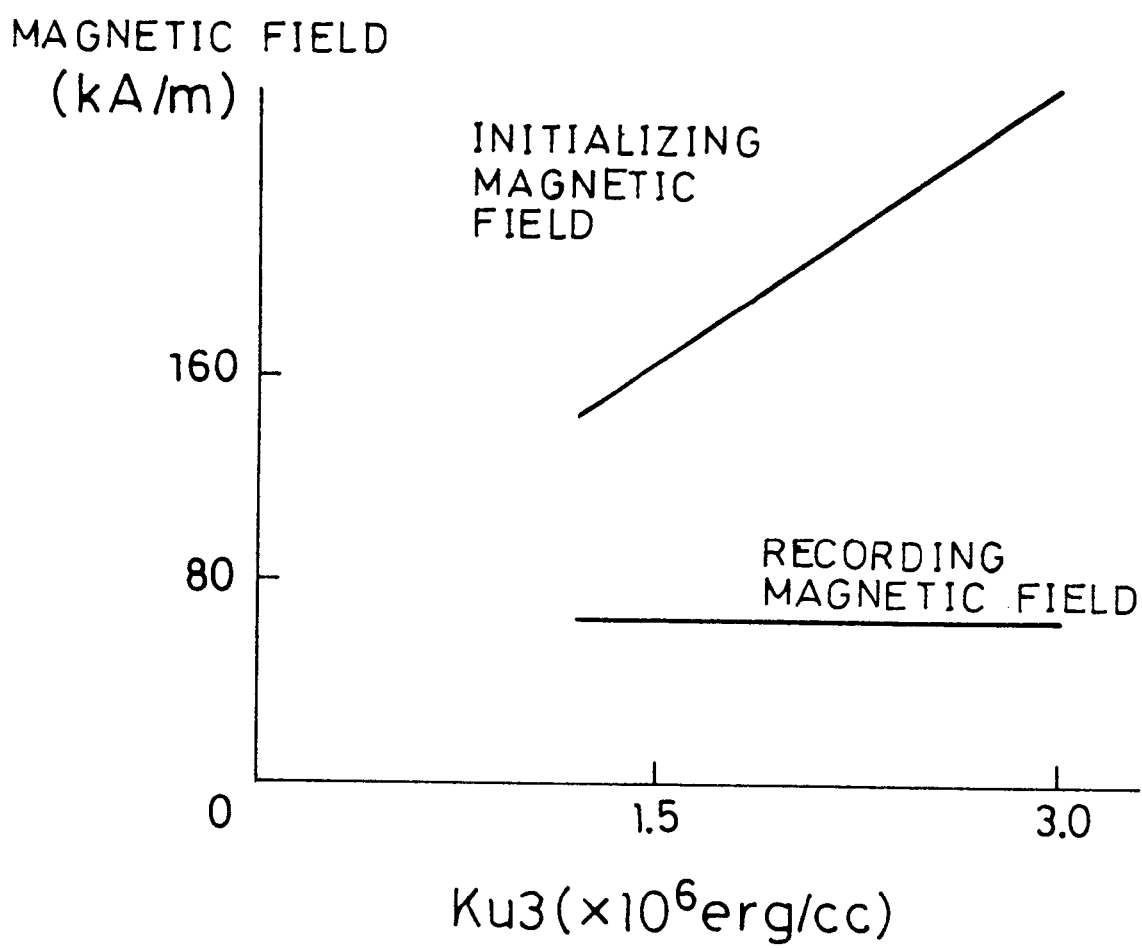
FIG. 10 is a graph illustrating a correlation between a perpendicular magnetic anisotropy of the third magnetic layer of the conventional magneto-optical disk and a recording magnetic field, and between the perpendicular magnetic anisotropy and an initializing magnetic field.

In contrast, the conventional magneto-optical recording medium requires an initializing magnetic field greater than a recording magnetic field, as shown in FIG. 9. Therefore, it is impossible to carry out light modulation overwriting with respect to the conventional magneto-optical recording medium solely by means of the recording magnetic field.

In the first and second embodiments, glass was used as the substrate 1 in samples #1 through #6. Other than the glass, however, chemically tempered glass, a so-called 2P layered glass substrate composed of (1) a substrate made of glass or chemically tempered glass and (2) an ultraviolet ray hardening resin film formed on the glass substrate, polycarbonate (PC), polymethyl methacrylate (PMMA), amorphous polyolefin (APO), polystyrene (PS), polybiphenyl chloride (PVC), epoxy, etc., may substitute for the substrate 1.

The thickness of the transparent dielectric layer 2 made of AlN is not restricted to 80 nm. The thickness of the transparent dielectric layer 2 is determined in consideration of the so-called Kerr effect enhancement, namely, a phenomenon that during reproduction from a magneto-optical recording medium a polar Kerr rotation angle of light from the first magnetic layer 3 or the zeroth magnetic layer 7 is augmented by making use of an interference effect of light. In order to achieve as high a carrier-to-noise ratio as possible in reproduction, it is required to augment the polar Kerr rotation angle. For this reason, the thickness of the transparent dielectric layer 2 is set so that the greatest possible polar Kerr rotation angle is obtained.

In addition to the above-described role in relation to the Kerr effect enhancement, the transparent dielectric layer 2 in combination with the protective layer 6 prevents the oxidization of the first through third magnetic layer 3 through 5, or the zeroth magnetic layer 7 and the first through third magnetic layers 3 through 5, which are respectively made of rare earth-transition metal alloys.

Furthermore, an AlN film may be obtained by a reactive DC (direct current) sputtering which is carried out by using an Al target and introducing $N_2$ gas or mixed gas of Ar and $N_2$. This sputtering method has an advantage that a higher film forming speed can be achieved compared with the RF (radio frequency) sputtering method.

Other than AlN, the following substances are suitable as material of the transparent dielectric layer 2: SiN, AlSiN, AlTaN, SiAlON, TiN, TiON, BN, ZnS, $TiO_2$, $BaTiO_3$, $SrTiO_3$, and others. The use of SiN, AlSiN, AlTaN, TiN, BN, and ZnS, among others, ensures that magneto-optical disks which have an excellent moisture resistance are provided, since the above substances do not include oxygen in their respective compositions.

The respective compositions of DyFeCo used in the first magnetic layer 3, GdFeCo used in the second magnetic layer 4, and GdDyFeCo used in the third magnetic layer 5 are not restricted to these shown in the above embodiments, provided that the properties of the respective magnetic layers 3 through 5 are met. As materials for the first through third magnetic layers 3 through 5, an alloy may be used which is a combination of at least one element selected from the rare-earth metal group consisting of Gd, Tb, Dy, Ho, and Nd and at least one element selected from the transition metal group consisting of Fe and Co.

Furthermore, by adding at least one element selected from the group consisting of Cr, V, Nb, Mn, Be, Ni, Ti, Pt, Rh, and Cu, the respective resistances to environment of the first through third magnetic layers 3 through 5 can be improved. Namely, the deterioration of the properties of the first through third magnetic layers 3 through 5 due to the oxidation of the material by moisture and oxygen being entered can be prevented, thereby ensuring a reliable performance of the magneto-optical disk for a long period of time.

The respective film thicknesses of the first through third magnetic layers 3 through 5 are determined by considering the correlation among the materials used in the first through third magnetic layers 3 through 5, the compositions thereof, and the thickness of other magnetic layers. To be more specific, the film thickness of the first magnetic layer 3 is preferably set to or above 20 nm, and more preferably to or above 30 nm. On the other hand, when the first magnetic layer is too thick, information recorded in the third magnetic layer 5 may not be copied thereto. Therefore, it is preferably set to or below 100 nm. The film thickness of the second magnetic layer 4 is preferably set to or above 5 nm, whereas it is preferably set to or below 100 nm since information recorded in the third magnetic layer 5 may not copied thereto when the second magnetic layer 4 becomes too thick. The thickness of the second magnetic layer 4 is more preferably set to or above 10 nm and to or below 50 nm. The film thickness of the third magnetic layer 5 is preferably set to or above 20 nm, whereas to or below 200 nm since information recorded thereon may not copied to the other magnetic layers when it is too thick. The thickness of the third magnetic layer 5 is more preferably set to or above 30 nm and to or below 100 nm.

The thickness of the AlN film as the protective layer 6 was set to 80 nm in the present embodiments, but it is not restricted to as such. The film thickness of the protective layer 6 is preferably set to or above 1 nm and to or below 200 nm.

The thermal conductivity of the protective layer 6 as well as that of the transparent dielectric layer 2 affects the recording sensitivity of the magneto-optical disk. Specifically, the recording sensitivity represents the laser power required for recording or erasing. Light incident on the magneto-optical disk is mainly transmitted through the transparent dielectric layer 2. Then, it is absorbed by the first through third magnetic layers 3 through 5 which are absorbing films. The light thus absorbed is changed into heat there. Here, the heat thus generated in the first through third magnetic layers 3 through 5 is transmitted through the transparent dielectric layer 2 and the protective layer 6 by thermal conduction. Therefore, the respective thermal conductivities and the thermal capacities (specific heat) of the transparent dielectric layer 2 and the protective layer 6 affect the recording sensitivity.

This means that the recording sensitivity of the magneto-optical disk can be controlled to some extent by adjusting the film thickness of the protective layer 6. For example, by making the protective layer 6 thinner, the recording sensitivity can be improved (recording or erasing operation be carried out with a lower laser power). Normally, in order to extend the life of the laser, it is preferable to have relatively high recording sensitivity, and thus the thinner protective layer 6 is preferable.

In this sense also, AlN is suitable material. Because of its excellent moisture resistance, by adopting it to the protective film 6, the film thickness can be reduced and the magneto-optical disk which ensures a high recording sensitivity can be achieved. When the protective layer 6 as well as the transparent dielectric layer 2 is made of AlN as is the case with the present embodiments, it is possible to provide a magneto-optical disk which has an excellent moisture resistance, and to enhance the productivity by producing the protective layer 6 and the dielectric layer 2 with the same material.

In considering the above objective and effect, other than AlN, the following substances which can be used also as material for the transparent dielectric layer 2 are suitable also for the protective layer 6: SiN, AlSiN, AlTaN, SiAlON, TiN, TiON, BN, ZnS, $TiO_2$, $BaTiO_3$, $SrTiO_3$, and others. The use of SiN, AlSiN, AlTaN, TiN, BN, and ZnS, among others, ensures that magneto-optical disks which have excellent moisture resistance are provided since the above substances do not include oxygen in their compositions.

The magneto-optical disks of samples #1 through #6 are so-called single-sided type. Hereinafter a thin film composed of the transparent dielectric layer 2, the first through third magnetic layers 3 through 5 (or the first through third magnetic layers 3 through 5 and the zeroth magnetic layer 7), and the protective layer 6 is referred to as a recording medium layer. Accordingly, the magneto-optical disk of the single-sided type is composed of the substrate 1, the recording medium layer, and the overcoat layer.

On the other hand, a magneto-optical disk composed of two substrates whereon recording medium layers are respectively laminated is called double-sided type, the two substrates being stuck to one another by an adhesive layer so that respective recording medium layers confront one another. As material for the adhesive layer, polyurethane acrylate adhesive is especially suitable. The above adhesive layer has a combination of hardening properties obtained by ultraviolet ray, heat and anaerobic. Therefore, this adhesive layer has an advantage that a portion of the adhesive layer shaded by the recording medium, to which the ultraviolet ray is not transmitted, can be hardened by heat and anaerobic handening property. Because of its high moisture resistance thus obtained, a reliable performance of the magneto-optical disk can be ensured for a long period of time.

The magneto-optical disk of the single-sided type is suitable for a compact magneto-optical recording and reproducing apparatus because the disk of the single-sided type is half in thickness of that of the double-sided type. In contrast, the disk of the double-sided type is suitable for a recording and reproducing apparatus requiring a large capacity because it is possible to record to and reproduce from the both sides.

Although the magneto-optical disks were used in the foregoing embodiments as examples of the magneto-optical recording media, the present invention is also applicable to a magneto-optical tape and a magneto-optical card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising at least a first magnetic layer, in which information is recorded, and a second magnetic layer, said second magnetic layer executing an auxiliary operation when information is recorded in said first magnetic layer;

wherein said first and second magnetic layers both are perpendicular magnetic films made of rare-earth transition metal alloys;

wherein said first magnetic layer has a lower Curie temperature and a higher coercive force at room temperature as compared with said second magnetic layer;

wherein said first magnetic layer and second magnetic layer are constituted so overwriting is accomplished using one external magnetic field; and wherein said second magnetic layer has a perpendicular magnetic anisotropy Ku2 at room temperature, said Ku2 satisfying:

$$0.3 \times 10^6 \text{ erg/cc} < Ku2 < 1.0 \times 10^6 \text{ erg/cc}.$$

2. A magneto-optical recording method comprising the steps of:

preparing a magneto-optical recording medium including at least a first magnetic layer, in which information is recorded, and a second magnetic layer, the second magnetic layer executing an auxiliary operation when information is recorded in the first magnetic layer, the first and second magnetic layers both being perpendicular magnetic films made of rare-earth transition metal alloys, the first magnetic layer having a lower Curie temperature and a higher coercive force at room temperature as compared with the second magnetic layer, the second magnetic layer being rare-earth metal rich at room temperature and transition metal rich at elevated temperatures, the second magnetic layer having a perpendicular magnetic anisotropy Ku2 at room temperature, where Ku2 satisfies:

$$0.3 \times 10^6 \text{ erg/cc} < Ku2 < 1.0 \times 10^6 \text{ erg/cc};$$

initializing the second magnetic layer so as to align the magnetization direction thereof to one direction by applying an external magnetic field while irradiating it with an auxiliary light beam having an intensity of Pr;

maintaining the second magnetic layer at a rare-earth metal rich state by irradiating it with a first light beam having an intensity Pl greater than the intensity Pr of the auxiliary light beam while applying the external magnetic field, and then allowing the second magnetic layer to have a temperature drop so as to copy the direction of each sublattice magnetization from the second magnetic layer to the first magnetic layer; and changing the state of the second magnetic layer to a transition metal rich state by irradiating it with a second light beam having an intensity Ph greater than the intensity Pl of the first light beam while applying the external magnetic field so as to align the sublattice magnetization direction of the transition metal to the same direction as the external magnetic field, and then allowing the second magnetic layer to have a temperature drop so as to have a rare-earth metal rich state so that the direction of each sublattice magnetization is copied from the second magnetic layer to the first magnetic layer.

3. The magneto-optical recording method as set forth in claim 2, wherein for the magneto-optical recording medium being prepared:

the first magnetic layer is transition metal rich in a temperature range from room temperature to a Curie temperature of the first magnetic layer; and the second magnetic layer is rare-earth metal rich at room temperature and has a compensation temperature falling in a temperature range between room temperature and the Curie temperature of the second magnetic layer.

4. The magneto-optical recording method as set forth in claim 3, wherein for the magneto-optical medium being prepared the compensation temperature of the second magnetic layer is higher than the Curie temperature of the first magnetic layer.

5. The magneto-optical recording method as set forth in claim 4, wherein the magneto-optical recording medium being prepared further includes a third magnetic layer provided between the first and second magnetic layers, where the third magnetic layer is made of a rare earth-transition metal alloy that is rare-earth metal rich at room temperature and has a Curie temperature higher than that of the first magnetic layer.

6. The magneto-optical recording method as set forth in claim 5, wherein for the magneto-optical recording medium being prepared the Curie temperature of the third magnetic layer is higher than that of the second magnetic layer, and the compensation temperature of the third magnetic layer is lower than the compensation temperature of the second magnetic layer and lower than the Curie temperature of the first magnetic layer.

7. The magneto-optical recording method as set forth in claim 2, wherein the magneto-optical recording medium prepared further includes an initial magnetic layer provided on a surface of the first magnetic layer, the surface being opposite to a surface on which side the second magnetic layer is provided, the initial magnetic layer having an in-plane magnetization at room temperature, and having a perpendicular magnetization in a temperature range between room temperature and the Curie temperature of the first magnetic layer.

8. The magneto-optical recording method as set forth in claim 7, wherein for the magneto-optical recording medium being prepared the initial magnetic layer has a Curie temperature higher than that of the first magnetic layer.

9. The magneto-optical recording method as set forth in claim 2, wherein for the magneto-optical recording medium being prepared the perpendicular magnetic anisotropy Ku2 of the second magnetic layer at room temperature satisfies:

$$0.3 \times 10^6 \text{ erg/cc} < Ku2 < 0.6 \times 10^6 \text{ erg/cc}.$$

10. The magneto-optical recording method as set forth in claim 2, wherein the external magnetic field being applied during any of said initializing, said maintaining and said changing has a strength of not more than 80 kA/m (1 kOe).

* * * * *